(12) United States Patent
Dyke et al.

(10) Patent No.: US 8,886,891 B2
(45) Date of Patent: Nov. 11, 2014

(54) SYSTEMS AND METHODS FOR MANAGING MEMORY CORE SURFACE

(75) Inventors: Kenneth Christian Dyke, Sunnyvale, CA (US); Jeremy Todd Sandmel, San Mateo, CA (US); Geoff Stahl, San Jose, CA (US); John Kenneth Stauffer, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 854 days.

(21) Appl. No.: 12/056,209

(22) Filed: Mar. 26, 2008

(65) Prior Publication Data

US 2009/0100213 A1  Apr. 16, 2009

Related U.S. Application Data

(60) Provisional application No. 60/979,027, filed on Oct. 10, 2007.

(51) Int. Cl.
*G06F 12/02* (2006.01)
*G06F 9/54* (2006.01)
*G06F 9/50* (2006.01)

(52) U.S. Cl.
CPC .............. *G06F 9/544* (2013.01); *G06F 9/5016* (2013.01)

USPC ........... 711/147; 711/100; 711/154; 711/203; 710/52; 710/56

(58) Field of Classification Search
USPC ............... 711/147, 100, 154, 203; 710/52, 56
See application file for complete search history.

(56) References Cited

U.S. PATENT DOCUMENTS

| | | | | |
|---|---|---|---|---|
| 5,590,326 A | * | 12/1996 | Manabe | 711/150 |
| 6,075,546 A | | 6/2000 | Hussain et al. | |
| 6,078,942 A | * | 6/2000 | Eisler et al. | 718/100 |
| 2003/0204681 A1 | * | 10/2003 | Arajs et al. | 711/147 |
| 2007/0255802 A1 | * | 11/2007 | Aloni et al. | 709/217 |

* cited by examiner

*Primary Examiner* — Arpan P. Savla
(74) *Attorney, Agent, or Firm* — Fish & Richardson P.C.

(57) ABSTRACT

Accessing a shared buffer can include receiving an identifier associated with a buffer from a sending process, requesting one or more attributes corresponding to the buffer based on the received identifier, mapping at least a first page of the buffer in accordance with the one or more requested attributes, and accessing an item of data stored in the buffer by the sending process. The identifier also can comprise a unique identifier. Further, the identifier can be passed to one or more other processes. Additionally, the one or more requested attributes can include at least one of a pointer to a memory location and a property describing the buffer.

27 Claims, 6 Drawing Sheets

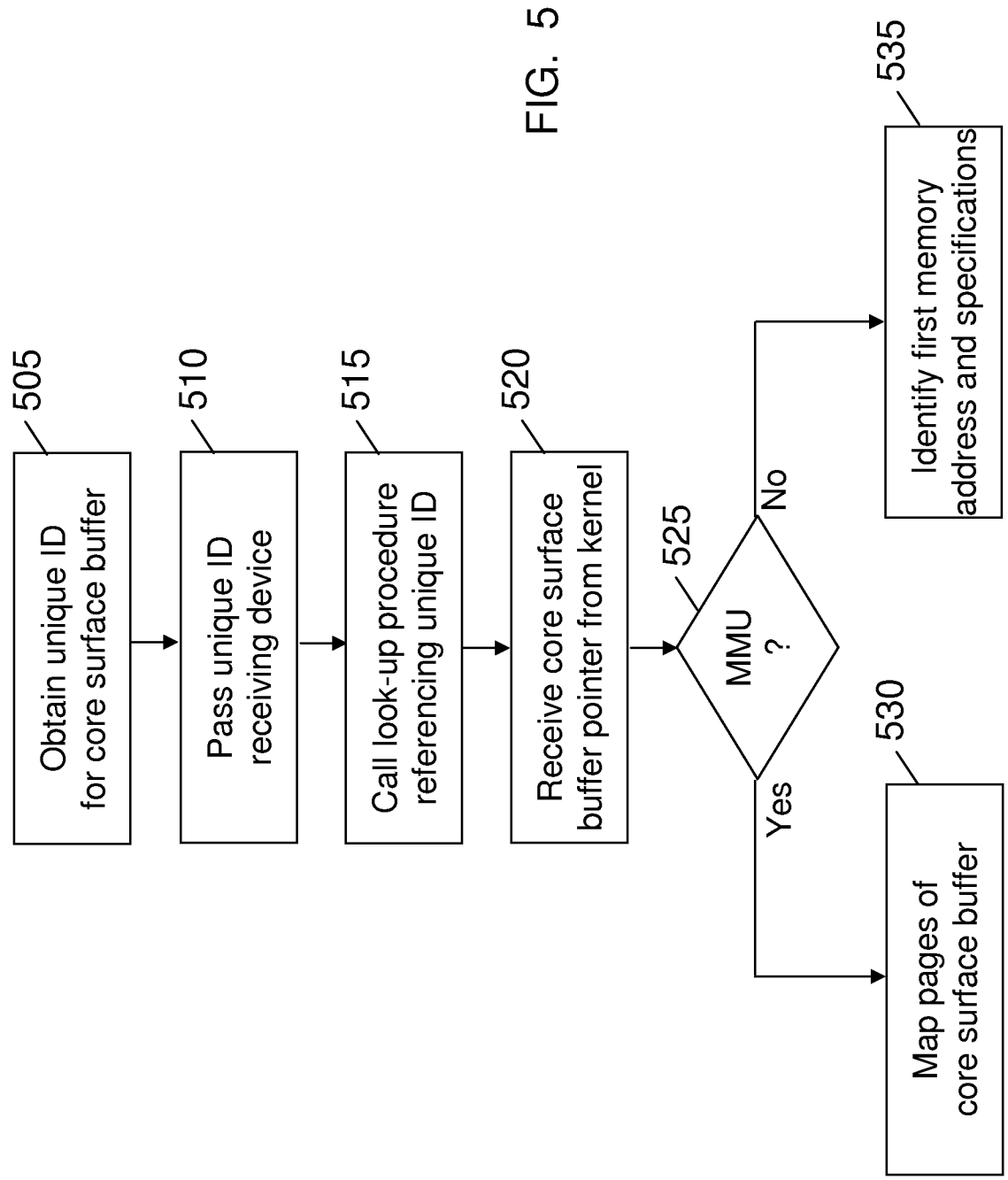

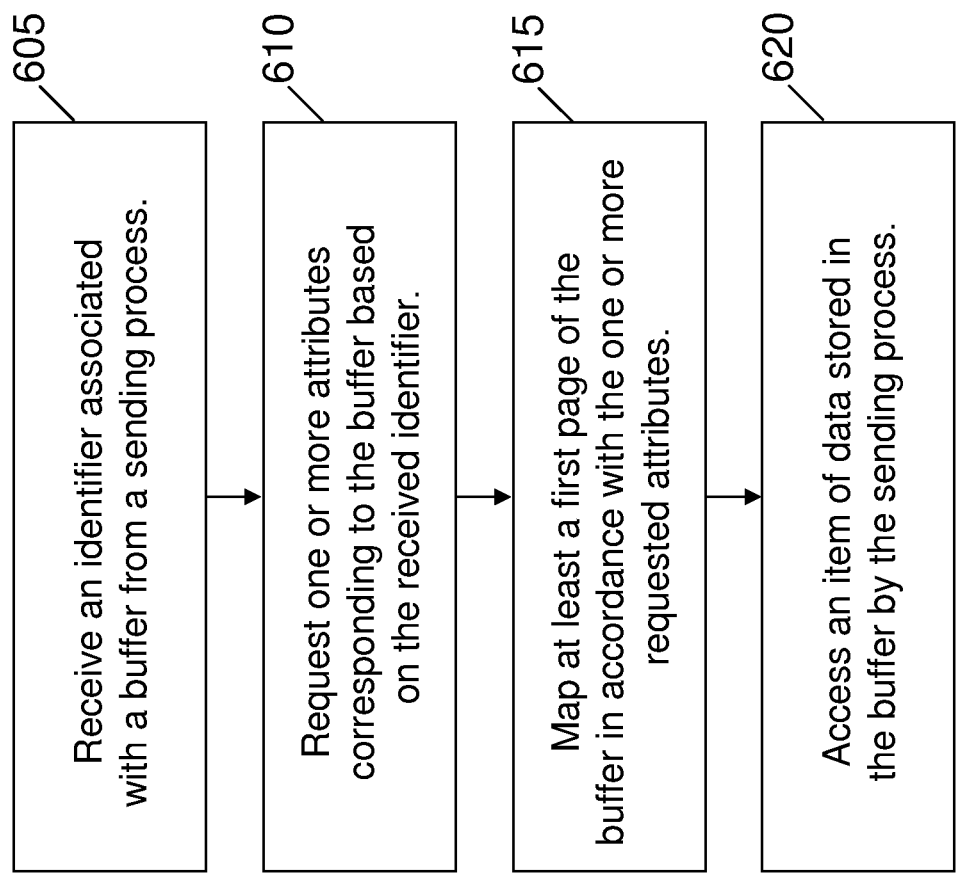

SYSTEMS AND METHODS FOR MANAGING MEMORY CORE SURFACE

This application claims priority to U.S. Provisional Application Ser. No. 60/979,027 filed Oct. 10, 2007, entitled "Systems and Methods for Managing Memory Core Surface". The disclosure of the prior application is considered part of, and is incorporated by reference in, the disclosure of this application.

TECHNICAL FIELD

The present disclosure relates to managing information system resources.

BACKGROUND

As computing devices have evolved to host greater numbers of concurrent processes (or "applications"), the need to efficiently manage system resources has increased. Volatile memory, such as Random Access Memory ("RAM"), is commonly used to store data associated with processes executing on a computing device. For example, volatile memory can be utilized to store data that is to be referenced by an executing process, such as data read from a storage medium with lower access speeds. Volatile memory also can be used to store the results generated by an executing process, such as data that is to be output to a presentation device or a persistent storage device. Memory controllers continually refresh the volatile memory to ensure that stored data is not lost. Further, memory controllers can be used to read information from and write information to the volatile memory.

The processes executing in a computing device are required to share the finite physical memory, including the volatile memory, that is available. Further, although a process can request and reserve a portion of the physical memory, the process must know how to address the memory it can use. In order to avoid conflicts, virtual memory has been implemented to permit executing processes to address virtual memory addresses without regard to physical memory addresses. An operating system kernel can be used to manage access to the physical memory by translating virtual memory addresses into physical memory addresses. For example, a page table for each process can be maintained by the kernel and used to translate virtual memory addresses into physical memory addresses.

Further, data stored in the physical memory can be transferred between processes. Because the application programming interface (API) and buffering scheme of a first process may be incompatible with the API and/or buffering scheme of a second process, the data can be reproduced in the receiving location. For example, data associated with the first process can be made available to the second process, which is executing within the same computing device, by copying the data from a physical memory address associated with the first process to a physical memory address associated with the second process. In this manner, data generated by one process, such as a result, can be provided as input to another process that is executing on the same computing device.

SUMMARY

A kernel operating in a computing system can be configured to manage the creation of one or more buffers in a memory device. The kernel further can be configured to control access to the one or more buffers by processes executing in the computing system. In order to share one or more buffers associated with a memory device, the present inventors recognized the need to identify each buffer by a system-wide global unique identifier. Further, the present inventors recognized the need to also permit a process that has access to a buffer to share that buffer with one or more additional processes by passing the global unique identifier.

The present inventors also recognized the need to permit a process to request the creation of a buffer that can be shared with one or more additional processes. Further, the need to generate a shared buffer in accordance with one or more specified requirements also was recognized. Additionally, the present inventors also recognized the need to permit a receiving process to determine one or more attributes describing a shared buffer from the kernel, based on the global unique identifier. Accordingly, the techniques and apparatus described here implement algorithms for managing the creation of and access to one or more shared buffers implemented in a memory device.

In general, in one aspect, the subject matter can be implemented to include receiving an identifier associated with a buffer from a sending process; requesting one or more attributes corresponding to the buffer based on the received identifier; mapping at least a first page of the buffer in accordance with the one or more requested attributes; and accessing an item of data stored in the buffer by the sending process.

The subject matter also can be implemented such that the one or more attributes include at least one of a pointer to a memory location and a property describing the buffer. Further, the subject matter can be implemented such that accessing an item of data further comprises performing an operation utilizing the item of data stored in the buffer. Additionally, the subject matter can be implemented such that one or more buffer properties are defined such that the buffer is interoperable with a plurality of applications.

The subject matter also can be implemented such that the identifier comprises a unique identifier. Further, the subject matter can be implemented to include passing the identifier to one or more other processes. Additionally, the subject matter can be implemented to include generating a user client to track the buffer.

In general, in another aspect, the subject matter can be implemented as a system comprising a memory managed by a kernel driver; and processor electronics for executing a receiving process, the processor electronics configured to perform operations comprising: receiving an identifier associated with a buffer from a sending process, wherein the buffer corresponds to at least a portion of the memory; requesting one or more attributes corresponding to the buffer from the kernel driver based on the received identifier; mapping at least a first page of the buffer in accordance with the one or more requested attributes; and accessing an item of data stored in the buffer by the sending process.

The subject matter also can be implemented such that the one or more attributes include at least one of a pointer to a memory location and a property describing the buffer. Further, the subject matter can be implemented such that the processor electronics configured to perform operations comprising accessing an item of data are further configured to perform an operation utilizing the item of data stored in the buffer. Additionally, the subject matter can be implemented such that one or more buffer properties are defined such that the buffer is interoperable with a plurality of applications.

The subject matter also can be implemented such that the identifier comprises a unique identifier. Further, the subject matter can be implemented such that the processor electronics are further configured to perform operations comprising passing the identifier to one or more other processes. Additionally, the subject matter can be implemented such that the processor electronics are further configured to perform operations comprising generating a user client to track the buffer.

In general, in another aspect, the subject matter can be implemented as a computer program product, encoded on a computer-readable medium, operable to cause data processing apparatus to perform operations comprising receiving an identifier associated with a buffer from a sending process; requesting one or more attributes corresponding to the buffer based on the received identifier; mapping at least a first page of the buffer in accordance with the one or more requested attributes; and accessing an item of data stored in the buffer by the sending process.

The subject matter also can be implemented to be further operable to cause data processing apparatus to perform operations comprising performing an operation utilizing the item of data stored in the buffer. Further, the subject matter can be implemented such that the one or more attributes include at least one of a pointer to a memory location and a property describing the buffer. Additionally, the subject matter can be implemented such that one or more buffer properties are defined such that the buffer is interoperable with a plurality of applications.

The subject matter also can be implemented to be further operable to cause data processing apparatus to perform operations comprising passing the identifier to one or more other processes. Further, the subject matter can be implemented such that the identifier comprises a unique identifier. Additionally, the subject matter can be implemented to be further operable to cause data processing apparatus to perform operations comprising generating a user client to track the buffer.

In general, in one aspect, the subject matter can be implemented to include obtaining, by a receiving process, an identifier associated with a buffer from a sending process; requesting one or more attributes corresponding to the buffer based on the received identifier; mapping at least a first page of the buffer in accordance with the one or more requested attributes; and performing an operation based on an item of data stored in the buffer by the sending process.

The techniques described in this specification can be implemented to realize none, one or more of the following advantages. For example, the techniques can be implemented such that a buffer implemented in a memory device can be shared by two or more processes. The techniques also can be implemented such that a sending process can identify a buffer to a receiving process by passing a global unique identifier associated with the buffer. The techniques further can be implemented to include looking up one or more attributes corresponding to a buffer by calling a procedure referencing the global unique identifier associated with the buffer. Additionally, the techniques can be implemented to permit a process to identify a previously allocated buffer to a memory management kernel and to receive a global unique identifier that can be used to share the previously allocated buffer with one or more additional processes.

The details of one or more implementations are set forth in the accompanying drawings and the description below. Other features and advantages will be apparent from the description and drawings, and from the claims.

BRIEF DESCRIPTION OF THE DRAWINGS

FIG. 5 shows an example flowchart for accessing a core surface buffer using a received global unique identifier.

FIG. 6 shows an example flowchart for accessing a shared buffer.

Like reference symbols indicate like elements throughout the specification and drawings.

DETAILED DESCRIPTION

Figure 1:
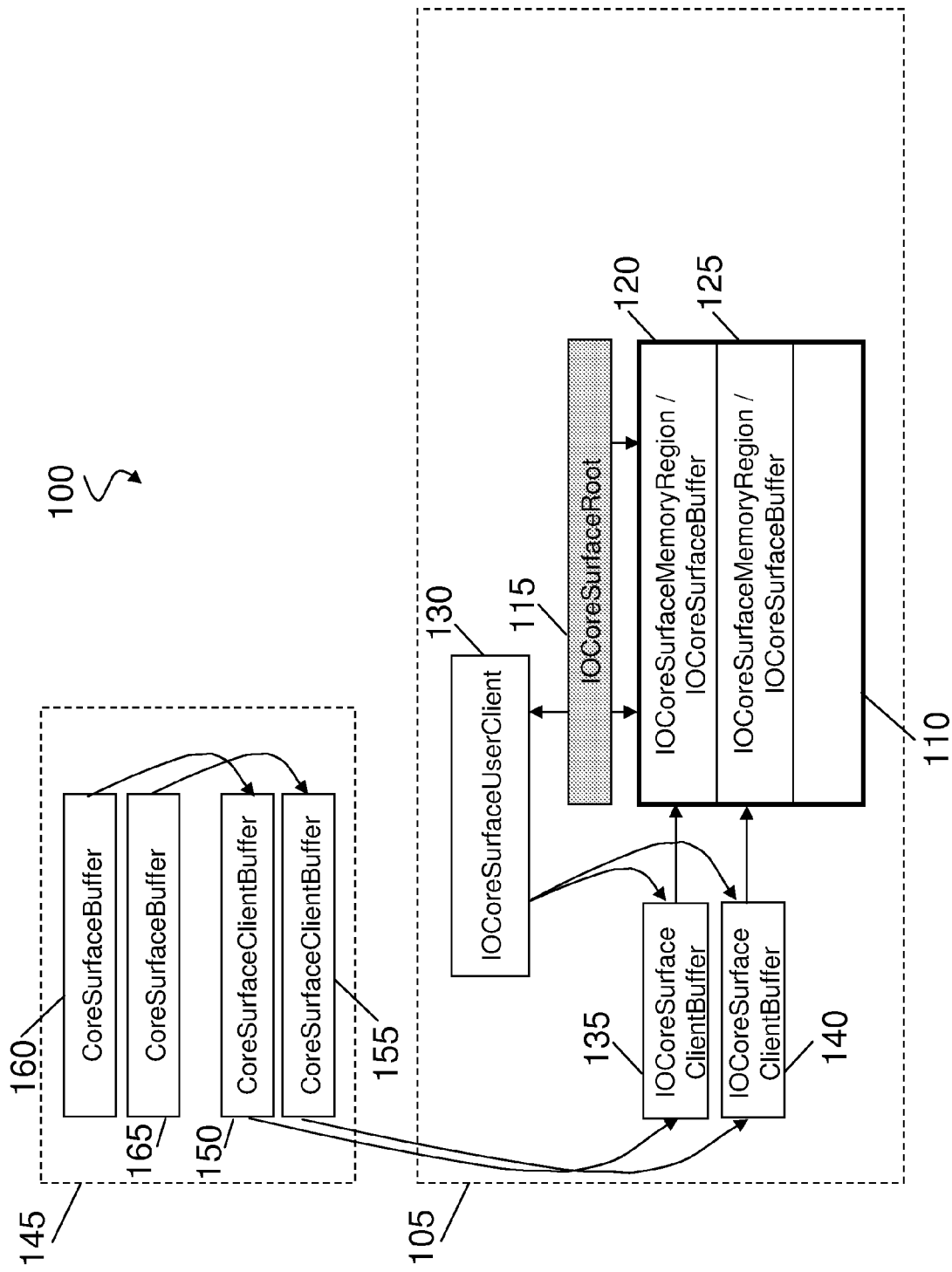
FIG. 1 depicts an example of generating and accessing one or more buffers in a memory device within a computing system.

FIG. 1 depicts generating and accessing one or more buffers in a memory device within a computing system 100. The computing system 100 can be implemented in any computing device that includes a processor and an addressable memory, such as a palmtop computer, a laptop computer, a desktop computer, a server, or a portable electronic device, such as a smart phone, a personal digital assistant, or a media device. The computing system 100 includes a kernel 105 that is configured to perform a memory management function. The computing system 100 also includes a physical memory 110, which can be implemented using a volatile memory such as Random Access Memory ("RAM"). The kernel 105 can be configured to manage all access to the physical memory 110.

The kernel 105 uses a standard buffer API to manage all input to and output from the physical memory 110 (or "core surface") that occurs within the computing system 100. Thus, a plurality of applications and hardware devices ("objects") operating within the computing system 100 can share one or more buffers defined with respect to the physical memory 110. For example, a plurality of hardware components included in the computing system 100 can be configured to use a core surface compatible API, thus permitting the plurality of hardware components to access a common buffer associated with the physical memory 110.

The IOCoreSurfaceRoot 115 of the kernel 105 can be configured to manage one or more memory devices included in the computing system 100. Further, the IOCoreSurfaceRoot 115 can be configured to define and maintain one or more IOCoreSurfaceMemoryRegions corresponding to a memory device, such as the physical memory 110. Each IOCoreSurfaceMemoryRegion can be assigned a unique descriptor. For example, the IOCoreSurfaceRoot 115 can define and maintain the IOCoreSurfaceMemoryRegions 120 and 125 which are defined with respect to the physical memory 110. Additionally, an IOCoreSurfaceBuffer can be created that corresponds to a particular IOCoreSurfaceMemoryRegion. For example, an IOCoreSurfaceBuffer can be created that corresponds to the IOCoreSurfaceMemoryRegion 120. In an implementation, more that one IOCoreSurfaceBuffer can be associated with an IOCoreSurfaceMemoryRegion. An IOCoreSurfaceBuffer can be used to store one or more data items associated with a process. Further, an IOCoreSurfaceBuffer can be configured to store one or more items of data describing itself, including a buffer format, a buffer width, a buffer height, and an initial offset.

The IOCoreSurfaceRoot 115 also can be configured to interact with an IOCoreSurfaceUserClient 130, which is associated with a single process executing in the computing system 100. An IOCoreSurfaceUserClient can be created in the kernel for each process executing in the computing system 100. Alternatively, an IOCoreSurfaceUserClient can be created only for processes configured to interact with the core surface, such as a process that requests or accesses an IOCoreSurfaceBuffer.

Further, the IOCoreSurfaceUserClient can be configured to track one or more IOCoreSurfaceClientBuffers that correspond to the process with which the IOCoreSurfaceUserClient is associated. For example, the IOCoreSurfaceUserClient 130 can be configured to track the IOCoreSurfaceClientBuffer 135 and the IOCoreSurfaceClientBuffer 140. An IOCoreSurfaceClientBuffer also wraps an IOCoreSurfaceBuffer to provide buffer access to the associated application. For example, the IOCoreSurfaceBuffer corresponding to the IOCoreSurfaceMemoryRegion 120 is wrapped by the IOCoreSurfaceClientBuffer 135.

As described above, the computing system 100 also can include one or more executing processes, such as the process 145. Further, the process 145 can include one or more CoreSurfaceClientBuffers, such as the CoreSurfaceClientBuffers 150 and 155. A CoreSurfaceClientBuffer associated with a process corresponds to an IOCoreSurfaceClientBuffer associated with the kernel. Together, the CoreSurfaceClientBuffer and the IOCoreSurfaceClientBuffer form a bridge between an executing process and the kernel.

The CoreSurfaceClientBuffer also can be associated with a corresponding CoreSurfaceBuffer that exists within the process 145. For example, the CoreSurfaceClientBuffers 150 and 155 are wrapped by the CoreSurfaceBuffers 160 and 165, respectively. A CoreSurfaceBuffer represents the highest level buffer implementation based on the physical memory 110 and exposes buffer functionality to the associated process. For example, a CoreSurfaceBuffer provides a process with the ability to access and manipulate data stored in the physical memory 110. Further, a CoreSurfaceBuffer, such as the CoreSurfaceBuffer 160, is associated with an IOCoreSurfaceBuffer, such as the IOCoreSurfaceBuffer corresponding to the IOCoreSurfaceMemoryRegion 120.

Figure 2:
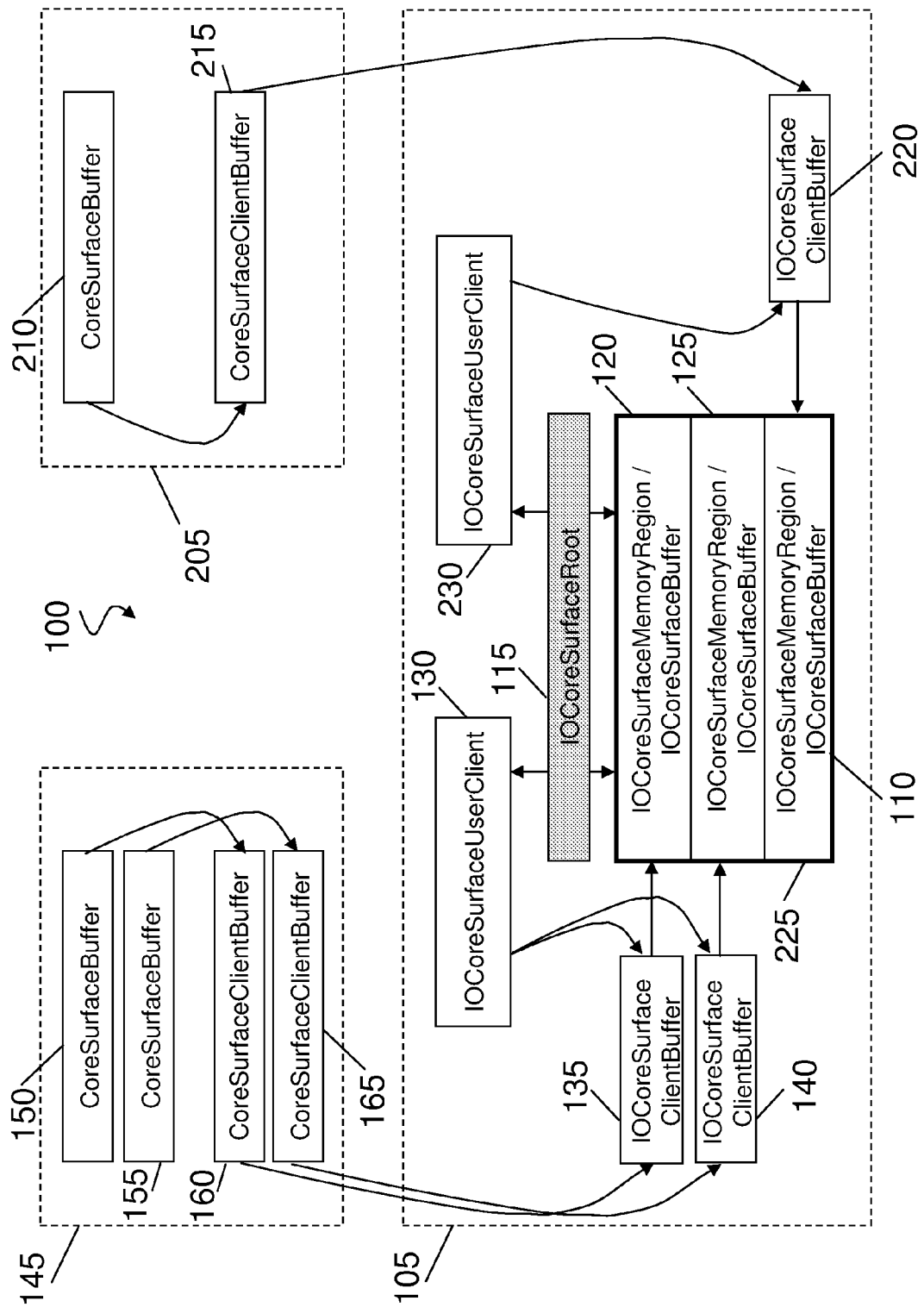
FIG. 2 shows an example of an additional process executing in the computing system.

FIG. 2 shows an additional process 205 executing in the computing system 100. The process 205 includes a CoreSurfaceBuffer 210, which wraps the associated CoreSurfaceClientBuffer 215. The CoreSurfaceClientBuffer 215 also is associated with a corresponding IOCoreSurfaceClientBuffer 220 associated with the kernel 105. Together, the IOCoreSurfaceClientBuffer 220 and the CoreSurfaceClientBuffer 215 form a bridge between the process 205 and the kernel 105.

An IOCoreSurfaceUserClient 230 associated with the process 205 also can be created in the kernel 105. The IOCoreSurfaceUserClient 230 can be configured to track the IOCoreSurfaceClientBuffer 220, which is associated with an IOCoreSurfaceBuffer corresponding to the IOCoreSurfaceMemoryRegion 225. Thus, a first process 145 and a second process 205 executing in the computing system 100 can share the physical memory 110, with each process having access to one or more buffers implemented in the physical memory 110. Further, the kernel 105 can manage access to the buffers by the first process 145 and a second process 205.

Figure 3:
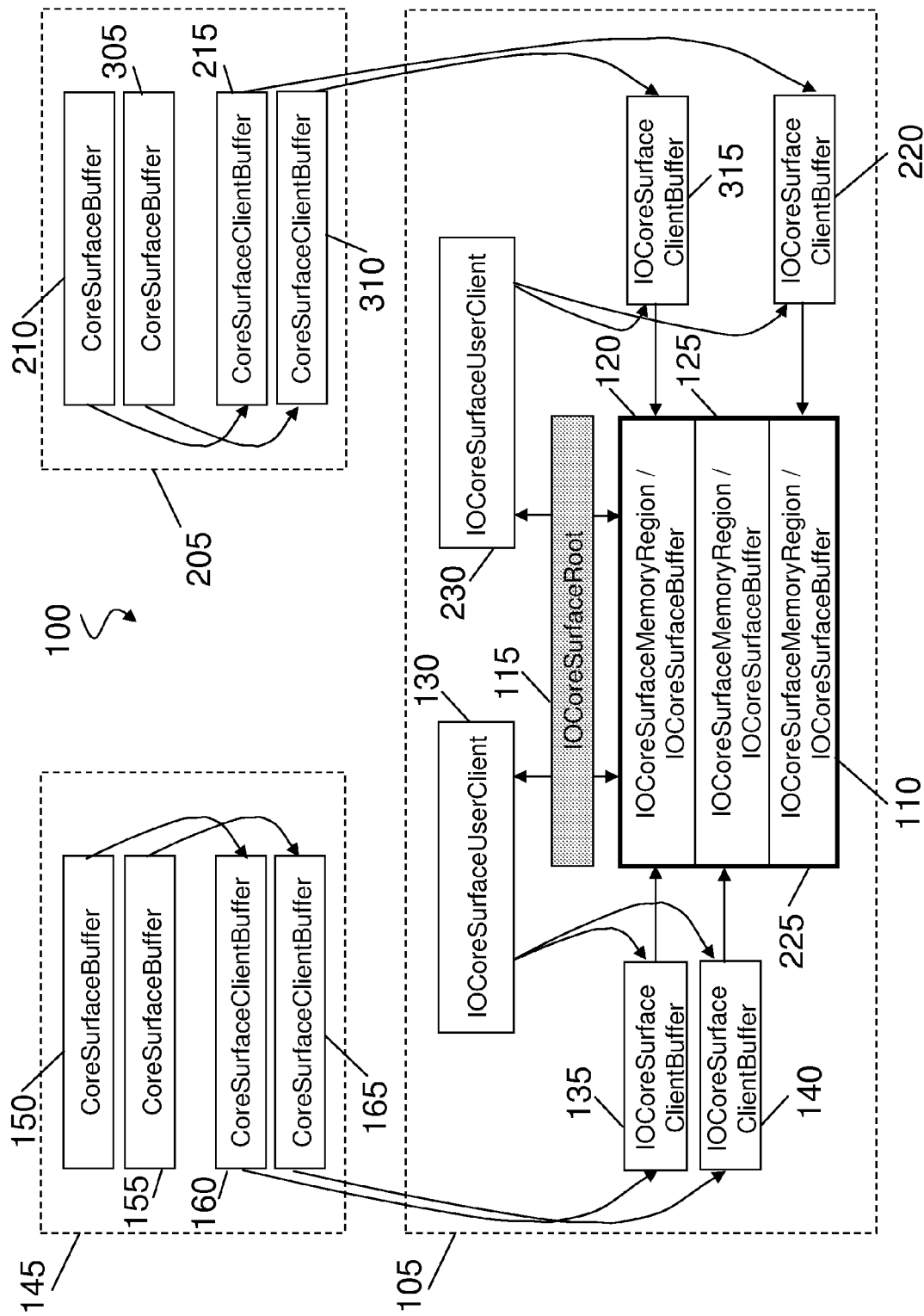
FIG. 3 shows an example of two processes associated with the computing system, each of which has access to a common buffer.

FIG. 3 shows two processes associated with the computing system 100, each of which has access to a common IOCoreSurfaceBuffer. An IOCoreSurfaceClientBuffer can be associated with any IOCoreSurfaceBuffer that has been created by the kernel 105. Thus, multiple IOCoreSurfaceClientBuffers can be associated with a common IOCoreSurfaceBuffer, providing buffer access to each of the processes associated with the IOCoreSurfaceClientBuffers.

For example, the process 205 includes the CoreSurfaceBuffer 305, which wraps the CoreSurfaceClientBuffer 310. Further, the kernel 105 includes the IOCoreSurfaceClientBuffer 315, which is associated with the CoreSurfaceClientBuffer 310 of the process 205. Additionally, the IOCoreSurfaceClientBuffer 315 is associated with the IOCoreSurfaceBuffer that corresponds to the IOCoreSurfaceMemoryRegion 120. Thus, the single IOCoreSurfaceBuffer corresponding to the IOCoreSurfaceMemoryRegion 120 is associated with both the IOCoreSurfaceClientBuffer 135 corresponding to the process 145 and the IOCoreSurfaceClientBuffer 315 corresponding to the process 205. As a result, each of the processes 145 and 205 can access the IOCoreSurfaceBuffer.

Further, a sending process, such as the process 145, can identify to a receiving process, such as the process 205, an IOCoreSurfaceBuffer that is to be shared. For example, the kernel 105 can generate a system-wide global unique identifier that is associated with an IOCoreSurfaceBuffer. The global unique identifier can be passed from the kernel 105 to the process that requested creation of the buffer, such as the sending process. Further, the sending process can pass the global unique identifier to one or more receiving processes.

A receiving process can use the global unique identifier to gain access to the shared IOCoreSurfaceBuffer. For example, the receiving process can pass the global unique identifier to the kernel 105, such as through a look-up procedure. In response, the kernel 105 can provide one or more items of information required to access the shared IOCoreSurfaceBuffer, such as a pointer, to the receiving process. The receiving process can then map the shared IOCoreSurfaceBuffer and perform one or more operations using the data stored in the shared IOCoreSurfaceBuffer. Thus, a process can perform one or more operations with respect to data stored in an IOCoreSurfaceBuffer and then share the IOCoreSurfaceBuffer with one or more additional processes, which also can utilize the data stored in the IOCoreSurfaceBuffer. Further, the receiving process also can become a sending process by passing the global unique identifier to one or more processes. Additionally, the mapped shared IOCoreSurfaceBuffer also can be unmapped.

In an exemplary implementation, an IOCoreSurfaceBuffer can be used for video decoding. For example, the kernel 105 can allocate the IOCoreSurfaceBuffer corresponding to the IOCoreSurfaceMemoryRegion 120 to the process 145. The process 145 can decode a frame of video data into the IOCoreSurfaceBuffer, such as by decompressing stored video data. Further, the process 145 can provide the IOCoreSurfaceBuffer corresponding to the IOCoreSurfaceMemoryRegion 120 to the receiving process 205 by passing the global unique identifier that is associated with the IOCoreSurfaceBuffer. The process 205 also can perform one or more operations utilizing the decoded video data, such as formatting the decoded video data for presentation on a display device. Thus, an IOCoreSurfaceBuffer can be shared by a plurality of processes operating in a computing system 100 by passing a global unique identifier associated with the IOCoreSurfaceBuffer.

Figure 4:
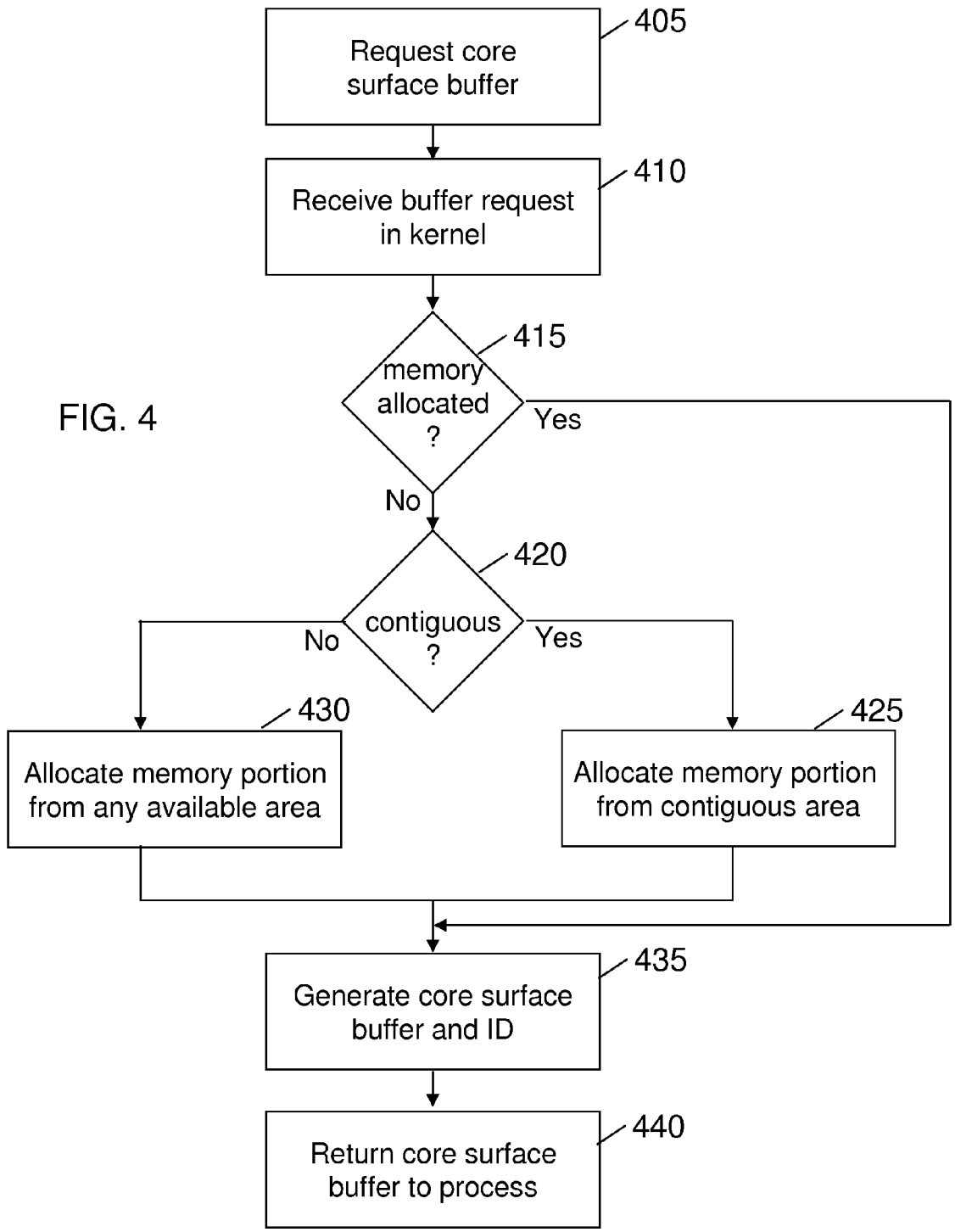
FIG. 4 shows an example flowchart for creating a core surface buffer for use by one or more processes.

FIG. 4 shows a flowchart for creating a core surface buffer (or "CoreSurfaceBuffer") for use by one or more processes. A core surface buffer can be any size, up to the total amount of memory available. A process executing in the computing system can generate a request to create a core surface buffer (405). Further, the request can specify one or more desired attributes and/or properties of the core surface buffer. For example, if a core surface buffer is required for a video processing operation, the specified properties can include one or more of a pitch, a width, a height, a pixel format, and an allocation size. In an implementation, any desired attributes and properties can be specified in a dictionary, which can be passed with the request to create the buffer. Further, the request can be generated by calling a procedure that specifies the one or more desired attributes and/or properties of the core surface buffer.

The request to create the core surface buffer is received in the kernel (410). For example, the request can be received by a user client in the kernel, such as the IOCoreSurfaceUserClient, that is associated with the process that initially generated the buffer request. Further, the associated user client can forward the request to the IOCoreSurfaceRoot of the kernel, which can generate the requested core surface buffer. The IOCoreSurfaceRoot can determine whether memory corresponding to the core surface buffer request has been allocated (415). For example, an existing portion of memory previously allocated to the requesting process can be converted into a core surface buffer. By wrapping the existing memory in a global unique identifier, the memory can be passed to other processes that also are executing in the computing system.

If memory has not already been allocated for the requested core surface buffer, the IOCoreSurfaceRoot can determine whether the memory is required to be contiguous (420). In virtual memory, the address space associated with a buffer may be contiguous although the corresponding physical memory space is not. Thus, a particular buffer can be incompatible with one or more process types. Therefore, a process can be configured to request contiguous memory if it is required for a particular application. For example, if a process is requesting creation of a core surface buffer for use in video decoding, the process can request a contiguous memory region of the core surface.

Further, the memory region can be specified such that it includes all of the properties necessary to be interoperable with all of the devices and applications that will interact with the corresponding core surface buffer. Therefore, a process can specify a named memory region, such as graphics memory, from which the core surface buffer is to be allocated. The named memory region can be managed such that all allocations from that memory region are guaranteed to be physically contiguous. If the memory associated with the requested core surface buffer is required to be contiguous, memory can be allocated from a named memory region (425). Otherwise, the memory associated with the requested core surface buffer can be allocated from any available memory region (430).

The allocated memory region is used to generate the requested core surface buffer, which can be identified and referenced by an assigned system-wide global unique identifier (435). Similarly, if the memory for the core surface buffer had previously been allocated, the previously allocated memory is assigned a system-wide global unique identifier (435). The global unique identifier can be any reference that is unique within the computing system. For example, any unique number can be assigned to identify the core surface buffer. In an implementation, the global unique identifier can be generated based on a kernel pointer.

Further, the kernel can pass information permitting the process to access the generated core surface buffer back to the requesting process (440). For example, the IOCoreSurfaceRoot of the kernel can pass the core surface buffer to the IOCoreSurfaceUserClient in the kernel, which can wrap the core surface buffer as an IOCoreSurfaceClientBuffer. The IOCoreSurfaceUserCient can then track the IOCoreSurfaceClientBuffer and pass a reference to the requesting process, such as the global unique identifier.

FIG. 5 shows a flowchart for accessing a core surface buffer using a received global unique identifier. A process can obtain a global unique identifier corresponding to a core surface buffer (505). As described above, the global unique identifier can correspond to a newly requested core surface buffer. Alternatively, the global unique identifier can correspond to a previously allocated core surface buffer that has been assigned a global unique identifier for purposes of sharing the buffer with one or more other processes. The global unique identifier can be passed to any other process that exists in the computing system (510). Further, the global unique identifier can be passed at any time after the global unique identifier is generated and before the corresponding core surface buffer is destroyed.

A process receiving a global unique identifier can call a look-up procedure that references the global unique identifier (515). For example, a buffer look-up procedure can be called that passes the global unique identifier to a user client in the kernel, such as the IOCoreSurfaceUserClient. In response to the look-up, a core surface buffer pointer is received from the kernel (520). It also can be determined whether a memory management unit is associated with the receiving process (525). If a memory management unit is associated with the receiving process, the core surface buffer pages can be mapped in the memory management unit (530). Otherwise, the receiving process can identify the first physical address of the core surface buffer and one or more buffer attributes (535). For example, the process can assume that all of the addresses in the memory region are contiguous.

Once the receiving process can access the core surface buffer, the receiving process can use the buffer for any purpose. For example, the receiving process can read data from and/or write data to the core surface buffer. The receiving process also can pass the global unique identifier corresponding to the core surface buffer to one or more other processes, including the process from which the global unique identifier was received.

In an implementation, the receiving process also can invoke one or more procedures to determine information about the core surface buffer. The procedures can reference the core surface buffer by the global unique identifier. For example, in the case of a core surface buffer used for video decoding, the receiving process can determine one or more of the pixel format type of the buffer, the buffer width, the buffer height, the bytes per row of the buffer, the base address of the buffer, the plane count, the plane width, the plane height, the base address of the plane, and the bytes per row of the plane. Other types of information can be obtained for other buffer types.

FIG. 6 shows a flowchart for accessing a shared buffer. Initially, an identifier associated with a buffer can be received from a sending process (605). One or more attributes corresponding to the buffer can be requested based on the received identifier (610). Further, at least a first page of the buffer can be mapped in accordance with the one or more requested attributes (615). Once at least the first page of the buffer has been mapped, an item of data stored in the buffer by the sending process can be accessed (620).

The processes described herein are not limited to use with any particular hardware, software, or programming language; they may find applicability in any computing or processing environment and with any type of machine that is capable of managing memory in one or more of the disclosed implementations. Actions associated with the processes can be performed by one or more programmable processors executing one or more computer programs to perform the functions of the processes.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data.

Actions associated with the processes can be rearranged and/or one or more such actions can be omitted to achieve the same, or similar, results to those described herein. Elements of different implementations described herein may be combined to form other implementations not specifically set forth above. A number of implementations have been disclosed herein. Nevertheless, it will be understood that various modifications may be made without departing from the spirit and scope of the claims. Accordingly, other implementations are within the scope of the following claims.

What is claimed is:

1. A method comprising:
    receiving, at a receiving process directly from a sending process, an identifier associated with a buffer, where the sending process received the identifier from a shared memory management process in response to a request to generate the buffer, where the buffer is generated by the shared memory management process and where the sending process, the receiving process and the shared memory management process are distinct processes executing on a computing device;
    determining whether the receiving process is associated with a memory management unit;
    sending, by the receiving process, a request to the shared memory management process for one or more attributes corresponding to the buffer that is identified using the received identifier, wherein the one or more attributes include a pointer to a shared memory location and information describing a format for data stored in the buffer;
    when the receiving process is associated with the memory management unit, mapping, in the memory management unit, at least a first page of the buffer to virtual memory associated with the receiving process in accordance with the one or more attributes including at least one property describing the format for data stored in the buffer; and
    accessing an item of data which was stored by the sending process in the buffer,
    wherein the method is performed by one or more processors.

2. The method of claim 1, wherein the one or more attributes include a pointer to a memory location.

3. The method of claim 1, wherein accessing an item of data further comprises performing an operation utilizing the item of data stored in the buffer.

4. The method of claim 1, wherein one or more buffer properties are defined such that the buffer is interoperable with a plurality of applications.

5. The method of claim 1, wherein the identifier comprises a unique identifier.

6. The method of claim 1, further comprising passing the identifier to one or more other processes.

7. The method of claim 1, further comprising generating a user client to track the buffer.

8. A system comprising:
    a memory managed by a kernel driver; and
    processor electronics for executing a receiving process, the processor electronics configured to perform operations comprising:
        receiving, at a receiving process directly from a sending process, an identifier associated with a buffer, where the sending process received the identifier from a shared memory management process in response to a request to generate the buffer, where the buffer is generated by the shared memory management process and where the sending process, the receiving process and the shared memory management process are distinct processes executing on a computing device;
        determining whether the receiving process is associated with a memory management unit;
        sending, by the receiving process, a request to the shared memory management process for one or more attributes corresponding to the buffer that is identified using the received identifier, wherein the one or more attributes include a pointer to a shared memory location and information describing a format for data stored in the buffer;
        when the receiving process is associated with the memory management unit, mapping, in the memory management unit, at least a first page of the buffer to virtual memory associated with the receiving process in accordance with the one or more attributes including at least one property describing the format for data stored in the buffer; and
        accessing an item of data which was stored by the sending process in the buffer.

9. The system of claim 8, wherein the one or more attributes include a pointer to a memory location.

10. The system of claim 8, wherein the processor electronics configured to perform operations comprising accessing an item of data are further configured to perform an operation utilizing the item of data stored in the buffer.

11. The system of claim 8, wherein one or more buffer properties are defined such that the buffer is interoperable with a plurality of applications.

12. The system of claim 8, wherein the identifier comprises a unique identifier.

13. The system of claim 8, wherein the processor electronics are further configured to perform operations comprising passing the identifier to one or more other processes.

14. The system of claim 8, wherein the processor electronics are further configured to perform operations comprising generating a user client to track the buffer.

15. A non-transitory computer-readable medium including one or more sequences of instructions which, when executed by one or more processors, causes:
    receiving, at a receiving process directly from a sending process, an identifier associated with a buffer, where the sending process received the identifier from a shared memory management process in response to a request to generate the buffer, where the buffer is generated by the shared memory management process and where the sending process, the receiving process and the shared memory management process are distinct processes executing on a computing device;
    determining whether the receiving process is associated with a memory management unit;
    sending, by the receiving process, a request to the shared memory management process for one or more attributes corresponding to the buffer that is identified using the received identifier, wherein the one or more attributes include a pointer to a shared memory location and information describing a format for data stored in the buffer;
    when the receiving process is associated with the memory management unit, mapping, in the memory management unit, at least a first page of the buffer to virtual memory associated with the receiving process in accordance with the one or more attributes including at least one property describing the format for data stored in the buffer; and accessing an item of data which was stored by the sending process in the buffer.

16. The non-transitory computer-readable medium of claim 15, wherein the one or more attributes include a pointer to a memory location.

17. The non-transitory computer-readable medium of claim 15, further operable to cause data processing apparatus to perform operations comprising performing an operation utilizing the item of data stored in the buffer.

18. The non-transitory computer-readable medium of claim 15, wherein one or more buffer properties are defined such that the buffer is interoperable with a plurality of applications.

19. The non-transitory computer-readable medium of claim 15, wherein the identifier comprises a unique identifier.

20. The non-transitory computer-readable medium of claim 15, further comprising instructions that cause passing the identifier to one or more other processes.

21. The non-transitory computer-readable medium of claim 15, further comprising instructions that cause generating a user client to track the buffer.

22. A method comprising:
receiving, at a receiving process directly from a sending process, an identifier associated with a buffer, where the sending process received the identifier from a shared memory management process in response to a request to generate the buffer, where the buffer is generated by the shared memory management process and where the sending process, the receiving process and the shared memory management process are distinct processes executing on a computing device;

determining whether the receiving process is associated with a memory management unit;

sending, by the receiving process, a request to the shared memory management process for one or more attributes corresponding to the buffer that is identified using the received identifier, wherein the one or more attributes include a pointer to a shared memory location and information describing a format for data stored in the buffer;

when the receiving process is associated with the memory management unit, mapping, in the memory management unit, at least a first page of the buffer to virtual memory associated with the receiving process in accordance with the one or more attributes including at least one property describing the format for data stored in the buffer; and performing an operation based on an item of data that was stored by the sending process in the buffer, wherein the method is performed by one or more processors.

23. The system of claim 8, wherein the identifier is a system-wide unique identifier on the computing device.

24. The method of claim 22, wherein one or more buffer properties are defined such that the buffer is interoperable with a plurality of applications.

25. The method of claim 22, wherein the identifier includes a unique identifier.

26. The method of claim 22, further comprising passing the identifier to one or more other processes.

27. The method of claim 22, further comprising generating a user client to track the buffer.

* * * * *